US012549141B2

United States Patent
Abdallah (10) Patent No.: US 12,549,141 B2
(45) Date of Patent: Feb. 10, 2026

(54) METHODS AND CIRCUITRY FOR CONTROLLING GAIN OF RADIO-FREQUENCY DATA CONVERTERS

(71) Applicant: Apple Inc., Cupertino, CA (US)

(72) Inventor: Mina Mofreh Gad Elsayed Abdallah, Munich (DE)

(73) Assignee: Apple Inc., Cupertino, CA (US)

( * ) Notice: Subject to any disclaimer, the term of this patent is extended or adjusted under 35 U.S.C. 154(b) by 539 days.

(21) Appl. No.: 18/148,293

(22) Filed: Dec. 29, 2022

(65) Prior Publication Data

US 2024/0223136 A1    Jul. 4, 2024

(51) Int. Cl.
  *H03F 3/19*   (2006.01)
  *H03G 3/30*   (2006.01)
  *H04B 1/40*   (2015.01)

(52) U.S. Cl.
  CPC ............ *H03F 3/19* (2013.01); *H03G 3/3036* (2013.01); *H04B 1/40* (2013.01); *H03F 2200/451* (2013.01); *H03G 2201/103* (2013.01); *H03G 2201/307* (2013.01)

(58) Field of Classification Search
  CPC ............... H03F 2200/451; H03F 3/19; H03G 2201/103; H03G 2201/307; H03G 3/3036; H04B 1/40
  See application file for complete search history.

(56) References Cited

U.S. PATENT DOCUMENTS

| | | | |
|---|---|---|---|
| 6,501,830 B1 * | 12/2002 | Allasia | H04B 3/493 379/406.01 |
| 7,236,756 B2 | 6/2007 | McGinn | |
| 8,547,270 B1 * | 10/2013 | Strode | H03M 1/1061 341/161 |
| 8,890,634 B2 | 11/2014 | Mahoney et al. | |
| 9,197,241 B2 * | 11/2015 | Liu | H03M 1/66 |
| 9,979,382 B1 * | 5/2018 | Chao | H03K 5/1565 |
| 11,038,470 B2 | 6/2021 | Norris | |
| 11,245,410 B1 * | 2/2022 | Dalla Longa | H03M 1/66 |
| 2022/0216980 A1 * | 7/2022 | Gao | H04L 25/0272 |
| 2024/0146325 A1 * | 5/2024 | Mulder | H03M 1/74 |

* cited by examiner

*Primary Examiner* — Nguyen T Vo
(74) *Attorney, Agent, or Firm* — Treyz Law Group; Jason Tsai Tsai (57) ABSTRACT

An electronic device with wireless circuitry is provided. The wireless circuitry can include a radio-frequency data converter block configured to receive baseband signals and to output corresponding radio-frequency signals to a radio-frequency power amplifier. The radio-frequency data converter block may include one or more radio-frequency digital-to-analog converter (DAC) cells configured to receive an oscillator signal. The radio-frequency data converter block can exhibit a gain that is controlled using gain control circuitry. The gain control circuitry can control the gain of the radio-frequency data converter block by selectively enabling switchable components within each DAC cell to realize an incremental gain step of a first resolution and by adjusting the duty cycle of the oscillator signal to realize an incremental gain step of a second resolution finer than the first resolution.

20 Claims, 6 Drawing Sheets

METHODS AND CIRCUITRY FOR CONTROLLING GAIN OF RADIO-FREQUENCY DATA CONVERTERS

FIELD

This disclosure relates generally to electronic devices and, more particularly, to electronic devices with wireless communications circuitry.

BACKGROUND

Electronic devices can be provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

Radio-frequency signals transmitted by an antenna can be fed through one or more power amplifiers, which are configured to amplify low power analog signals to higher power signals more suitable for transmission through the air over long distances. A radio-frequency power amplifier can receive a radio-frequency signal via a radio-frequency data converter. It is within this context that the embodiments herein arise.

SUMMARY

An electronic device may include wireless communications circuitry. The wireless communications circuitry can include one or more processors or signal processing blocks for generating baseband signals, a transceiver for receiving the digital signals and for generating corresponding radio-frequency signals, and one or more radio-frequency amplifiers configured to amplify the radio-frequency signals for transmission by one or more antennas in the electronic device. A radio-frequency amplifier can receive a radio-frequency signal.

An aspect of the disclosure provides wireless circuitry that includes a radio-frequency amplifier having an output coupled to an antenna, a radio-frequency digital-to-analog converter (DAC) having an output coupled to the radio-frequency amplifier and having an input configured to receive an oscillating signal, and gain control circuitry configured to control a gain of the radio-frequency DAC by adjusting a duty cycle of the oscillating signal. The gain control circuitry can be configured to increase the gain of the radio-frequency DAC by increasing the duty cycle of the oscillating signal and can be configured to decrease the gain of the radio-frequency DAC by decreasing the duty cycle of the oscillating signal. The gain control circuitry can be implemented as a frequency divider or a pulse generator. The gain control circuitry can be configured to control the gain by selectively activating and deactivating one or more switchable components within the radio-frequency DAC and by adjusting the duty cycle of the oscillating signal.

An aspect of the disclosure provides a method of operating wireless circuitry that includes using a radio-frequency data converter circuit to receive a baseband signal and to output a corresponding radio-frequency signal, adjusting a gain of the radio-frequency data converter circuit by selectively activating and deactivating components internal to the radio-frequency (RF) data converter circuit, receiving an oscillating signal at the radio-frequency data converter circuit, and adjusting the gain of the radio-frequency data converter circuit by adjusting a duty cycle of the oscillating signal. Activating and deactivating components internal to the RF data converter can implement a first incremental gain step, whereas adjusting the duty cycle of the oscillating signal implements a second incremental gain step less than the first incremental gain step. The method can further include increasing the gain of the radio-frequency data converter circuit by increasing the duty cycle of the oscillating signal and decreasing the gain of the radio-frequency data converter circuit by decreasing the duty cycle of the oscillating signal.

An aspect of the disclosure provides an electronic device that includes one or more processor configured to output a baseband signal, a radio-frequency data converter block configured to receive the baseband signal and to generate a corresponding radio-frequency signal, a radio-frequency amplifier having an input configured to receive the radio-frequency signal and having an output coupled to one or more antennas, an oscillator configured to output an oscillator signal to the radio-frequency data converter block, and gain control circuitry configured to control a gain of the radio-frequency data converter block by adjusting a characteristic of the oscillator signal. The radio-frequency data converter block can include a plurality of digital-to-analog converter (DAC) cells. The gain control circuitry can further be configured to control the gain of the radio-frequency data converter block by selectively activating and deactivating one or more internal components within each of the plurality of DAC cells.

DETAILED DESCRIPTION

Figure 1:
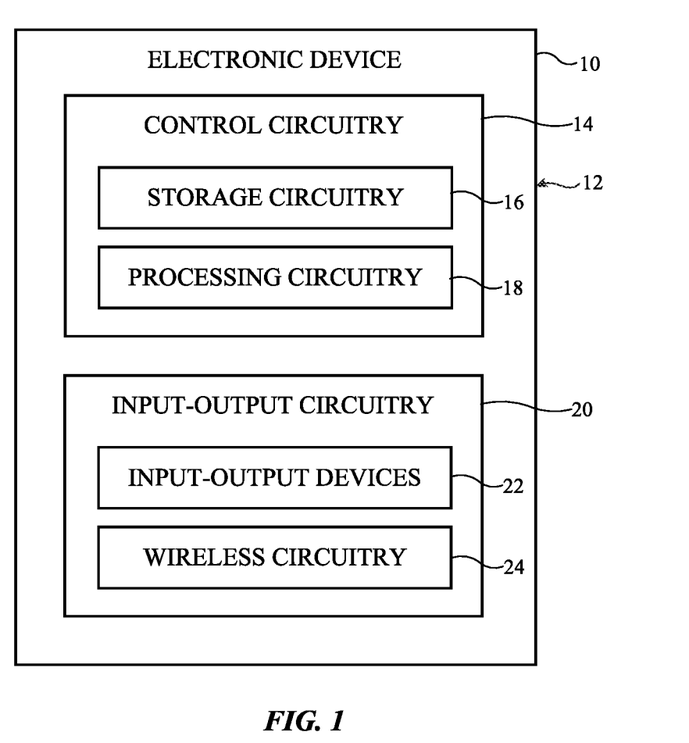
FIG. 1 is a diagram of an illustrative electronic device having wireless circuitry in accordance with some embodiments.

An electronic device such as device 10 of FIG. 1 may be provided with wireless circuitry. The wireless circuitry may include one or more processors, one or more antennas for transmitting and receiving radio-frequency signals, and a plurality of data converters coupled between the processor and the antennas. The data converters can be radio-frequency digital-to-analog converters (RFDACs) configured to receive a baseband signal from the processor, to convert the baseband signal from the digital domain to the analog domain, and to upconvert the baseband signal to a radio-frequency signal. The radio-frequency DACs can be provided with a first number of analog gain steps. The RFDACs can receive a local oscillator (LO) signal having an adjustable duty cycle. The duty cycle of the LO signal can be tuned to provide a second number of analog gain steps. Configured and operated in this way, the RFDACs can exhibit a total number of gain steps equal to the first number of analog gain steps multiplied by the second number of analog gain steps.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed from plastic, glass, ceramics, fiber composites, metal (e.g., stainless steel, aluminum, metal alloys, etc.), other suitable materials, or a combination of these materials. In some embodiments, parts or all of housing 12 may be formed from dielectric or other low-conductivity material (e.g., glass, ceramic, plastic, sapphire, etc.). In other embodiments, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using the antenna(s).

Wireless circuitry 24 may transmit and/or receive radio-frequency signals within a corresponding frequency band at radio frequencies (sometimes referred to herein as a communications band or simply as a "band"). The frequency bands handled by wireless circuitry 24 may include wireless local area network (WLAN) frequency bands (e.g., Wi-Fi® (IEEE 802.11) or other WLAN communications bands) such as a 2.4 GHZ WLAN band (e.g., from 2400 to 2480 MHZ), a 5 GHz WLAN band (e.g., from 5180 to 5825 MHZ), a Wi-Fi® 6E band (e.g., from 5925-7125 MHZ), and/or other Wi-Fi® bands (e.g., from 1875-5160 MHZ), wireless personal area network (WPAN) frequency bands such as the 2.4 GHz Bluetooth® band or other WPAN communications bands, cellular telephone frequency bands (e.g., bands from about 600 MHz to about 5 GHZ, 3G bands, 4G LTE bands, 5G New Radio Frequency Range 1 (FR1) bands below 10 GHZ, 5G New Radio Frequency Range 2 (FR2) bands between 20 and 60 GHz, etc.), other centimeter or millimeter wave frequency bands between 10-300 GHZ, near-field communications frequency bands (e.g., at 13.56 MHZ), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Figure 2:
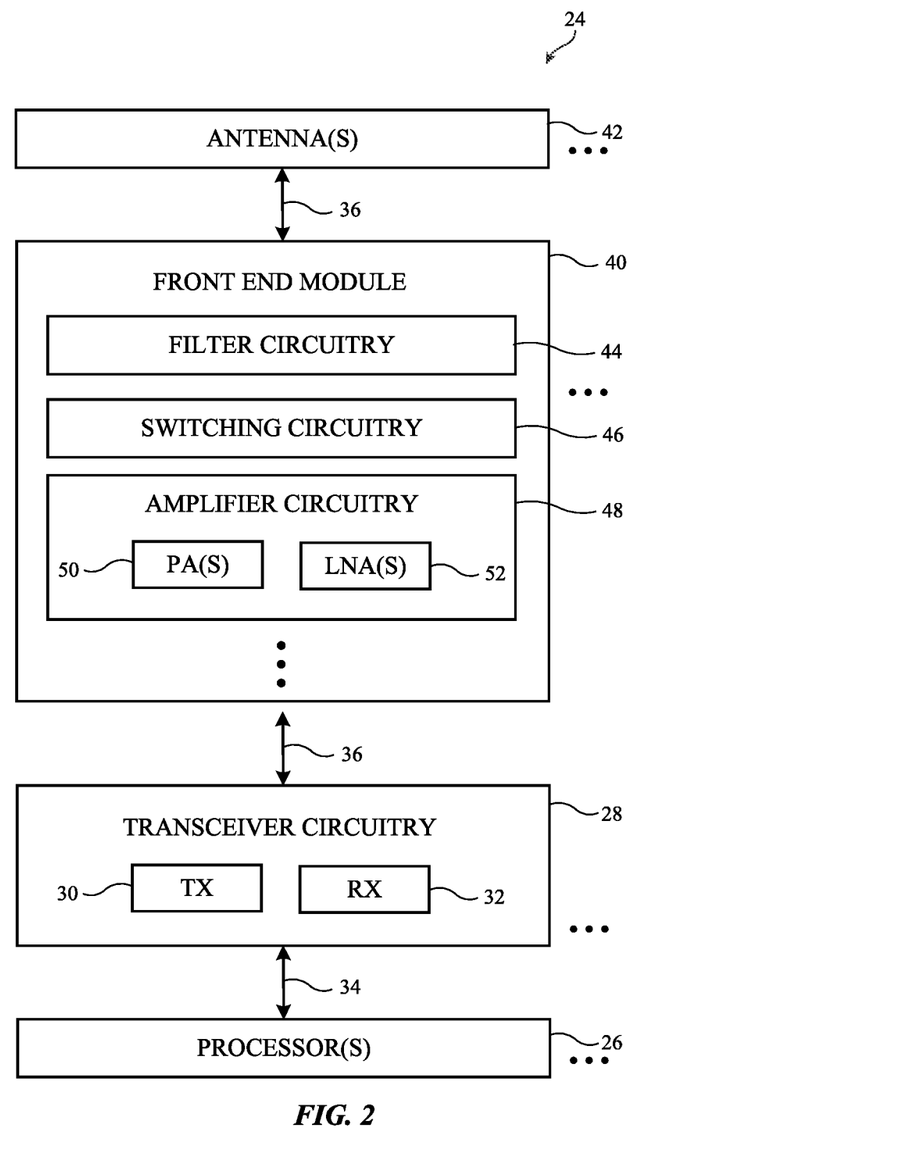
FIG. 2 is a diagram of illustrative wireless circuitry having amplifiers in accordance with some embodiments.

FIG. 2 is a diagram showing illustrative components within wireless circuitry 24. As shown in FIG. 2, wireless circuitry 24 may include a processor such as processor 26, radio-frequency (RF) transceiver circuitry such as radio-frequency transceiver 28, radio-frequency front end circuitry such as radio-frequency front end module (FEM) 40, and antenna(s) 42. Processor 26 may be a baseband processor, application processor, general purpose processor, microprocessor, microcontroller, digital signal processor, host processor, application specific signal processing hardware, or other type of processor. Processor 26 may be coupled to transceiver 28 over path 34. Transceiver 28 may be coupled to antenna 42 via radio-frequency transmission line path 36. Radio-frequency front end module 40 may be disposed on radio-frequency transmission line path 36 between transceiver 28 and antenna 42.

In the example of FIG. 2, wireless circuitry 24 is illustrated as including only a single processor 26, a single transceiver 28, a single front end module 40, and a single antenna 42 for the sake of clarity. In general, wireless circuitry 24 may include any desired number of processors 26, any desired number of transceivers 28, any desired number of front end modules 40, and any desired number of antennas 42. Each processor 26 may be coupled to one or more transceiver 28 over respective paths 34. Each transceiver 28 may include a transmitter circuit 30 configured to output uplink signals to antenna 42, may include a receiver circuit 32 configured to receive downlink signals from antenna 42, and may be coupled to one or more antennas 42 over respective radio-frequency transmission line paths 36. Each radio-frequency transmission line path 36 may have a respective front end module 40 disposed thereon. If desired, two or more front end modules 40 may be disposed on the same radio-frequency transmission line path 36. If desired, one or more of the radio-frequency transmission line paths 36 in wireless circuitry 24 may be implemented without any front end module disposed thereon.

Radio-frequency transmission line path 36 may be coupled to an antenna feed on antenna 42. The antenna feed may, for example, include a positive antenna feed terminal and a ground antenna feed terminal. Radio-frequency transmission line path 36 may have a positive transmission line signal path such that is coupled to the positive antenna feed terminal on antenna 42. Radio-frequency transmission line path 36 may have a ground transmission line signal path that is coupled to the ground antenna feed terminal on antenna 42. This example is illustrative and, in general, antennas 42 may be fed using any desired antenna feeding scheme. If desired, antenna 42 may have multiple antenna feeds that are coupled to one or more radio-frequency transmission line paths 36.

Radio-frequency transmission line path 36 may include transmission lines that are used to route radio-frequency antenna signals within device 10 (FIG. 1). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 36 may be integrated into rigid and/or flexible printed circuit boards.

In performing wireless transmission, processor 26 may provide transmit signals (e.g., digital or baseband signals) to transceiver 28 over path 34. Transceiver 28 may further include circuitry for converting the transmit (baseband) signals received from processor 26 into corresponding radio-frequency signals. For example, transceiver circuitry 28 may include mixer circuitry for up-converting (or modulating) the transmit (baseband) signals to radio frequencies prior to transmission over antenna 42. The example of FIG. 2 in which processor 26 communicates with transceiver 28 is illustrative. In general, transceiver 28 may communicate with a baseband processor, an application processor, general purpose processor, a microcontroller, a microprocessor, or one or more processors within circuitry 18. Transceiver circuitry 28 may also include digital-to-analog converter (DAC) and/or analog-to-digital converter (ADC) circuitry for converting signals between digital and analog domains. Transceiver 28 may use transmitter (TX) 30 to transmit the radio-frequency signals over antenna 42 via radio-frequency transmission line path 36 and front end module 40. Antenna 42 may transmit the radio-frequency signals to external wireless equipment by radiating the radio-frequency signals into free space.

Front end module (FEM) 40 may include radio-frequency front end circuitry that operates on the radio-frequency signals conveyed (transmitted and/or received) over radio-frequency transmission line path 36. FEM 40 may, for example, include front end module (FEM) components such as radio-frequency filter circuitry 44 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), radio-frequency amplifier circuitry 48 (e.g., one or more power amplifier circuits 50 and/or one or more low-noise amplifier circuits 52), impedance matching circuitry (e.g., circuitry that helps to match the impedance of antenna 42 to the impedance of radio-frequency transmission line 36), antenna tuning circuitry (e.g., networks of capacitors, resistors, inductors, and/or switches that adjust the frequency response of antenna 42), radio-frequency coupler circuitry, charge pump circuitry, power management circuitry, digital control and interface circuitry, and/or any other circuitry that operates on the radio-frequency signals transmitted and/or received by antenna 42. Each of the front end module components may be mounted to a common (shared) substrate such as a rigid printed circuit board substrate or flexible printed circuit substrate. If desired, the various front end module components may also be integrated into a single integrated circuit chip. If desired, amplifier circuitry 48 and/or other components in front end 40 such as filter circuitry 44 may also be implemented as part of transceiver circuitry 28.

Filter circuitry 44, switching circuitry 46, amplifier circuitry 48, and other circuitry may be disposed along radio-frequency transmission line path 36, may be incorporated into FEM 40, and/or may be incorporated into antenna 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 42 over time.

Transceiver 28 may be separate from front end module 40. For example, transceiver 28 may be formed on another substrate such as the main logic board of device 10, a rigid printed circuit board, or flexible printed circuit that is not a part of front end module 40. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, processor 26 and/or portions of transceiver 28 (e.g., a host processor on transceiver 28) may form a part of control circuitry 14. Control circuitry 14 (e.g., portions of control circuitry 14 formed on processor 26, portions of control circuitry 14 formed on transceiver 28, and/or portions of control circuitry 14 that are separate from wireless circuitry 24) may provide control signals (e.g., over one or more control paths in device 10) that control the operation of front end module 40.

Transceiver circuitry 28 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHZ WLAN band (e.g., from 5180 to 5825 MHZ), a Wi-Fi® 6E band (e.g., from 5925-7125 MHz), and/or other Wi-Fi® bands (e.g., from 1875-5160 MHZ), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHZ, 3G bands, 4G LTE bands, 5G New Radio Frequency Range 1 (FR1) bands below 10 GHZ, 5G New Radio Frequency Range 2 (FR2) bands between 20 and 60 GHz, etc.), near-field communications (NFC) transceiver circuitry that handles near-field communications bands (e.g., at 13.56 MHZ), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest.

Wireless circuitry 24 may include one or more antennas such as antenna 42. Antenna 42 may be formed using any desired antenna structures. For example, antenna 42 may be an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Two or more antennas 42 may be arranged into one or more phased antenna arrays (e.g., for conveying radio-frequency signals at millimeter wave frequencies). Parasitic elements may be included in antenna 42 to adjust antenna performance. Antenna 42 may be provided with a conductive cavity that backs the antenna resonating element of antenna 42 (e.g., antenna 42 may be a cavity-backed antenna such as a cavity-backed slot antenna).

As described above, front end module 40 may include one or more power amplifiers (PA) circuits 50 in the transmit (uplink) path. A power amplifier 50 (sometimes referred to as radio-frequency power amplifier, transmit amplifier, or amplifier) may be configured to amplify a radio-frequency signal without changing the signal shape, format, or modulation. Amplifier 50 may, for example, be used to provide 10 dB of gain, 20 dB of gain, 10-20 dB of gain, less than 20 dB of gain, more than 20 dB of gain, or other suitable amounts of gain.

Figure 3:
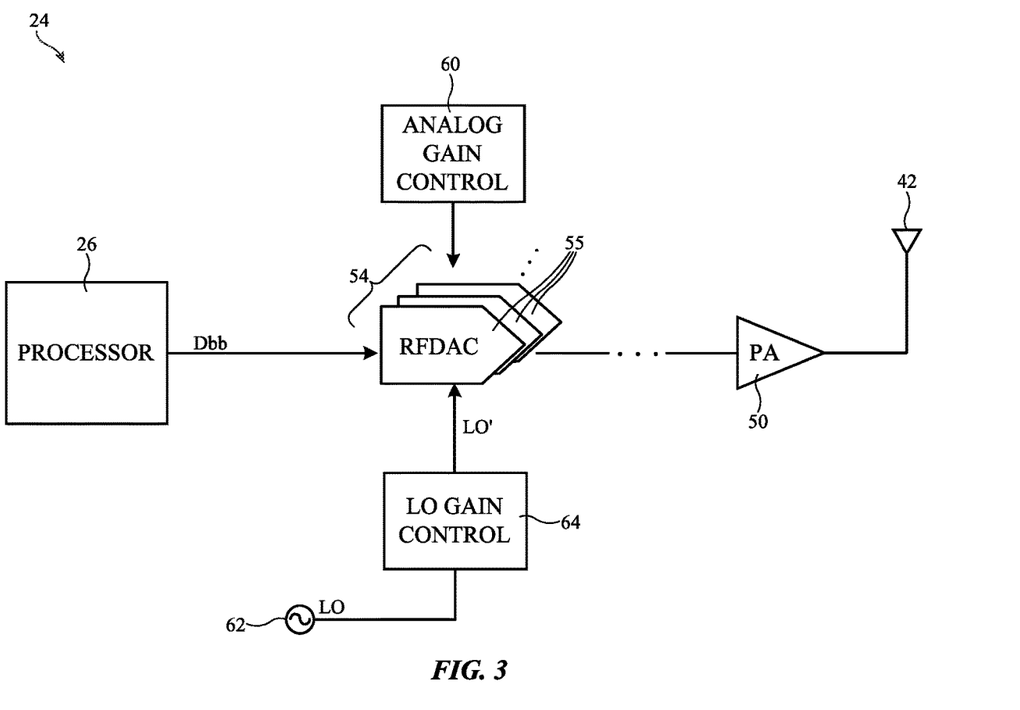
FIG. 3 is a diagram of illustrative wireless circuitry having radio-frequency digital-to-analog converters (DACs) configured to receive an oscillating signal with adjustable duty cycle in accordance with some embodiments.

FIG. 3 is a diagram of illustrative wireless circuitry 24 having radio-frequency digital-to-analog converters (DACs). As shown in FIG. 3, wireless circuitry 24 may include processor 26, a radio-frequency converter block such as radio-frequency converter block 54, a radio-frequency power amplifier such as radio-frequency amplifier 50, and an antenna 42 configured to radiate radio-frequency signals output from amplifier 50. The example of FIG. 3 in which processor 26 is shown as being directly coupled to radio-frequency converter block 54 is illustrative. In other embodiments, one or more additional transceiver based circuit components can be interposed between processor 26 and radio-frequency converter block 54. If desired, one or more additional transceiver based or RF front end based components can also be interposed between radio-frequency converter block 54 and amplifier 50.

Processor 26 may represent one or more processors such as a baseband processor, an application processor, a digital signal processor, a microcontroller, a microprocessor, a central processing unit (CPU), a programmable device, a combination of these circuits, and/or one or more processors within circuitry 18. Processor 26 may be configured to generate a digital baseband signal Dbb. Signal Dbb is sometimes referred to as a digital signal or a transmit signal. As examples, signal Dbb generated by processor 26 may include in-phase (I) and quadrature-phase (Q) signals, radius and phase signals, a vector input, or other digitally coded signals.

Radio-frequency converter block 54 may be configured to convert the digital baseband signals Dbb from the digital domain to the analog domain and to upconvert (modulate) the analog signals to radio frequencies. The term "radio-frequency converter" may thus refer to or be defined herein as a circuit that can perform both signal domain conversion (e.g., digital to analog conversion) and frequency upconversion (e.g., from baseband frequencies to radio frequencies or intermediate frequencies). Baseband frequencies can range from a couple hundred Hz to a couple hundred MHz. The input of amplifier 50 configured to receive radio-frequency signals can be referred to or defined herein as a radio-frequency input (port). Radio frequencies can range from hundreds of MHz to tens of GHz. RF converter block 54 may output a radio-frequency signal to the radio-frequency input of amplifier 50. Radio-frequency amplifier 50 may generate a corresponding amplified radio-frequency signal that can then be radiated by antenna(s) 42.

The example described above in which converter block 54 performs digital-to-analog conversion before conducting frequency upconversion in the analog domain is illustrative. In another embodiment, RF converter block 54 can perform frequency upconversion in the digital domain before conducting digital-to-analog conversion. In general, RF converter block 54 may include a plurality of N individual digital-to-analog converters (DACs) 55, each of which is sometimes referred to or defined herein as a radio-frequency DAC ("RFDAC") or RFDAC cell (e.g., converter block 54 can include N separate radio-frequency DACs 55). N can be any integer greater than two, greater than four, four to ten, 10 to 20, greater than 20, 20-50, greater than 50, 128 or more, 256 or more, 512 or more, 1024 or more, 1000-2000, greater than 2000, or other integer value.

Radio-frequency converter block 54 can exhibit a converter gain that is at least partially controlled by an associated control circuit such as analog gain control circuit 60. In one embodiment, analog gain control circuit 54 can be configured to adjust the gain of converter block 54 by selectively activating and deactivating one or more gain control capacitors within RF converter block 54. For example, analog control circuit 54 can switch into use all of gain control capacitors in each RFDAC 55 to operate block 54 in a high (maximum) gain mode. In other instances, analog control circuit 54 can switch into use only a portion of the gain control capacitors in each RFDAC 55 to reduce the overall gain of block 54. Adjusting the gain of RF converter block 54 by switching capacitors (or other adjustable components) in and out of use within each RFDAC cell 55 might only be capable of providing a relatively large gain step such as an incremental gain step of 6 dB or more.

In accordance with an embodiment, radio-frequency converter block 54 may be provided with an oscillating signal with an adjustable duty cycle to help enable a smaller gain step than is otherwise possible with only the analog gain control scheme described above. Still referring to FIG. 3, wireless circuitry 24 may further include an oscillator circuit such as oscillator 62. Oscillator 62 can include a crystal oscillator, a resonator, a surface acoustic wave (SAW) device, a variable-frequency oscillator, a microelectronic mechanical systems (MEMs) oscillator, a voltage-controlled oscillator, a frequency synthesizer, a phase-locked loop, a combination of these components, and/or other clock signal generator. Oscillator 62 can be integrated as part of the transceiver chip or can be formed as an external component separate from the transceiver chip. Oscillator 62 can output a square wave (e.g., a clock signal), a sinusoidal waveform, or other periodic waveform. The output of oscillator 62 can sometimes be referred to and defined herein as a local oscillator (LO) signal or oscillating signal LO. Device configurations in which oscillating signal LO is a clock signal are sometimes described herein as an example.

Wireless circuitry 24 may further include an additional gain control circuit such as local oscillator (LO) gain control circuit 64 coupled between oscillator 62 and RF converter block 54. Gain control circuit 60 and gain control circuit 64 are sometimes referred to herein as RFDAC gain control circuitry or gain control circuitry. LO gain control circuit 64 is sometimes referred to as an oscillator based gain controller. As shown in FIG. 3, oscillator based gain control circuit 64 can receive signal LO from oscillator 62 and generate a corresponding modified local oscillator signal LO'. Signal LO' is sometimes referred to as a modified oscillating signal or a modified version of signal LO that has been altered for the purposes of further adjusting the gain of RF converter block 54.

In some embodiments, LO gain control circuit 64 can be configured to tune a characteristic such as the duty cycle of signal LO' to adjust the gain of block 54. For example, assuming signal LO is a clock signal with a 50% duty cycle, gain controller 64 can nominally pass through signal LO unaltered as signal LO' (e.g., signal LO' has the same frequency and duty cycle as signal LO). As another example, again assuming signal LO is a clock signal with a 50% duty cycle, gain controller 64 can alternatively generate a modified signal LO' with an adjusted 25% duty cycle. Here, dynamically lowering the duty cycle of the local oscillator signal that is provided to each of the RFDACs 55 from 50% to 25% can help provide a relatively smaller gain step (e.g., compared to the gain step provided by analog gain controller 60) such as an incremental gain step of 3 dB or less. Thus, adjusting the duty cycle of signal LO' can be beneficial or technically advantageous by enabling a finer gain step (resolution) than would otherwise be possible for a local oscillator signal with a fixed duty cycle. In other words, analog gain controller 60 used for selectively activating components (e.g., capacitors) internal to one or more RFDACs 55 can provide coarse gain control, whereas LO gain controller 64 used for adjusting the duty cycle of the LO' signal can provide fine gain control for the RFDACs 55.

Figure 4:
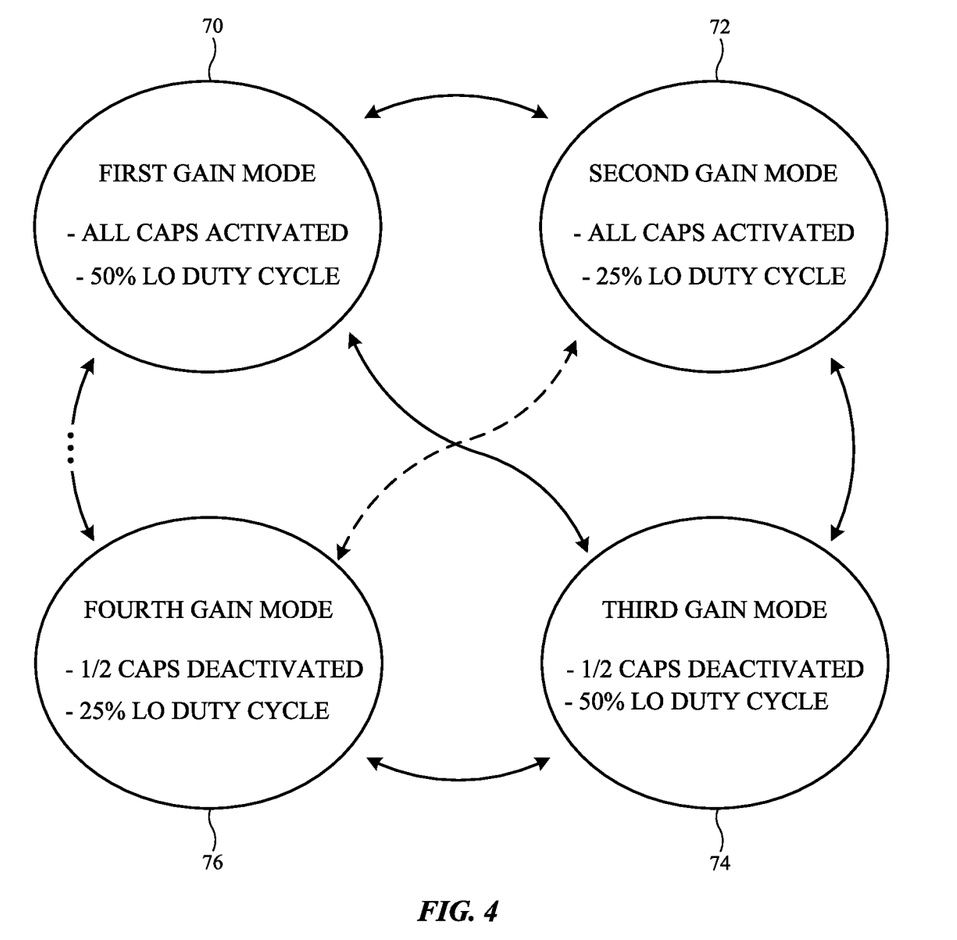
FIG. 4 is a state diagram showing various gain modes for operating the radio-frequency DACs of the type shown in FIG. 3 in accordance with some embodiments.

FIG. 4 is a state diagram showing various gain modes for operating wireless circuitry 24 of the type shown in FIG. 3. As shown in FIG. 4, the wireless circuitry can be operated in at least a first gain mode such as first gain mode 70, a second gain mode such as second gain mode 72, a third gain mode such as third gain mode 74, and a fourth gain mode such as fourth gain mode 76. During the first gain mode 70, analog gain control circuit 60 can be configured to activate all of the gain adjustment capacitors within RF converter block 54 (e.g., to switch into use all of the capacitors in each RFDAC cell 55) while LO gain control circuit 64 can be configured to output an oscillating signal with a 50% duty cycle (e.g., to output the LO' signal by passing through the LO signal without any modification). Operated in this way, the first gain mode 70 can represent a high (maximum) gain mode for RF converter block 54.

During the second gain mode 72, analog gain control circuit 60 can be configured to activate all of the gain adjustment capacitors within RF converter block 54 (e.g., to switch into use all of the capacitors in each RFDAC cell 55) while LO gain control circuit 64 can instead be configured to output an oscillating signal with a 25% duty cycle (e.g., to modify the incoming LO signal and to output a corresponding LO' signal with a smaller duty cycle). By only reducing the duty cycle of the local oscillator signal arriving at the RF converter block 54 without changing the settings of any internal switchable components within each RFDAC cell 55, the overall gain of the RF converter block 54 can be reduced relative to first gain mode 70 by a fine gain step of less than 5 dB, of less than 4 dB, of 3 dB or less, of 2 dB or less, of 2-4 dB, of 1-5 dB, of less than 6 dB, of less than 10 dB, or a gain step of other desired resolution.

During the third gain mode 74, analog gain control circuit 60 can be configured to activate only a subset (portion) of the gain adjustment capacitors within RF converter block 54 (e.g., to switch into use only half of the gain control capacitors in each RFDAC cell 55) while LO gain control circuit 64 can be configured to output an oscillating signal with a 50% duty cycle (e.g., to output the LO' signal by passing through the LO signal without any modification). By only reducing the number of gain adjustment components within each RFDAC cell 55 while keeping the duty cycle of the local oscillator signal arriving at the RF converter block 54 at 50%, the overall gain of the RF converter block 54 in the third gain mode 74 can be reduced relative to the first gain mode 70 by a course gain step of 5 dB or more, of 6 dB or more of 6-10 dB, of more than 10 dB, of 10-20 dB, of greater than 20 dB, or a gain step of other desired resolution.

In other words, the fine gain step from mode 70 to mode 72 is smaller than the coarse gain step from mode 70 to mode 74.

During the fourth gain mode 76, analog gain control circuit 60 can be configured to activate only a subset (portion) of the gain adjustment capacitors within RF converter block 54 (e.g., to switch into use only half of the gain control capacitors in each RFDAC cell 55) while LO gain control circuit 64 can instead be configured to output an oscillating signal with a 25% duty cycle (e.g., to modify the incoming LO signal and to output a corresponding LO' signal with a smaller duty cycle). By both reducing the duty cycle of the local oscillator signal arriving at the RF converter block 54 and changing the settings of any internal switchable components within each RFDAC cell 55, the overall gain of the RF converter block 54 can be further reduced relative to third gain mode 74 by another fine gain step of less than 5 dB, of less than 4 dB, of 3 dB or less, of 2 dB or less, of 2-4 dB, of 1-5 dB, of less than 6 dB, of less than 10 dB, or a gain step of other desired resolution. In other words, the fine gain step from mode 74 to mode 76 is smaller than the coarse gain step from mode 70 to mode 74.

The example of FIG. 4 in which the analog gain controller 60 and LO gain controller 64 can be configured to operate the RF converter block 54 in at least four different gain settings is illustrative. In other embodiments, first gain controller 60 can be configured to adjust one or more switchable components internal to each RFDAC cell 55 and/or second gain controller 64 can be configured to adjust the duty cycle of the oscillating signal provided to each RFDAC cell 55 to provide the RF converter block 54 with more than four different gain settings (gain mode), four to ten gain settings, 10 to 20 gain settings, 20-50 gain settings, 50-100 gain settings, or more than 100 gain settings. In some embodiments, additional gain settings or finer gain adjustment resolution can be provided by adjusting the duty cycle of the LO' signal to values other than 50% and 25%. For example, LO gain controller 64 can optionally adjust the LO' signal to exhibit a duty cycle of 12.5%, 37.5%, 33%, 10%, 20%, 30%, 40%, or other fractional value less than 50%.

Figure 5:
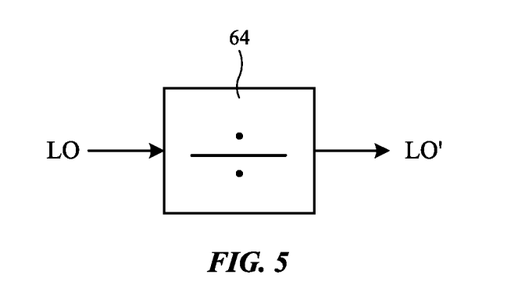
FIG. 5 is a diagram of an illustrative frequency divider circuit in accordance with some embodiments.
Figure 6:
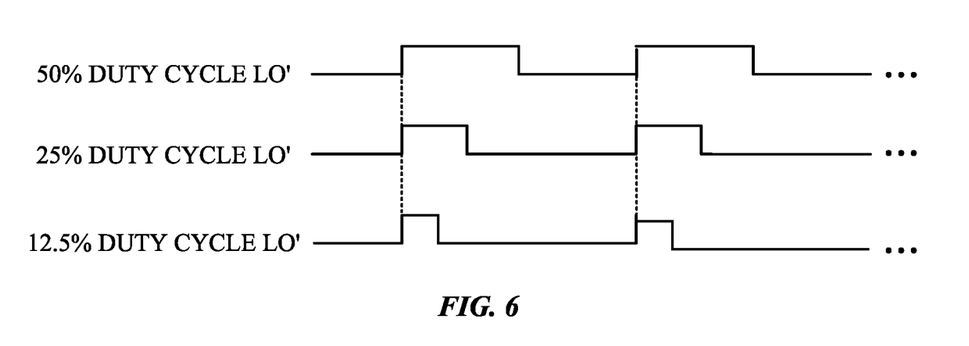
FIG. 6 is a timing diagram showing oscillating signals with different duty cycles in accordance with some embodiments.

The LO gain control circuit 64 can be implemented in various ways. FIG. 5 shows how LO gain controller 64 can be implemented as a frequency divider 64'. As shown in FIG. 5, frequency divider 64' can receive local oscillator signal LO from an oscillator and can generate a corresponding signal LO' with an adjustable duty cycle. FIG. 6 is a timing diagram showing oscillating signals with different duty cycles in accordance with some embodiments. As shown in FIG. 6, frequency divider 64' can generate an LO' signal with a 50% duty cycle, an LO' signal with 25% duty cycle, an LO' signal with 12.5% duty cycle, and/or an LO' signal with other duty cycles to provide other gain steps (e.g., a duty cycle of 12.5%, 37.5%, 33%, 10%, 20%, 30%, 40%, or other fractional value less than 50%).

Figure 7:
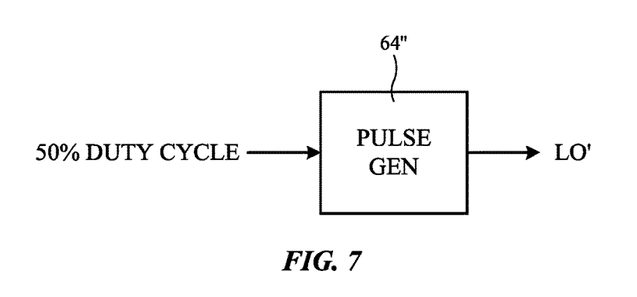
FIG. 7 is a diagram of an illustrative pulse generation circuit in accordance with some embodiments.
Figure 8:
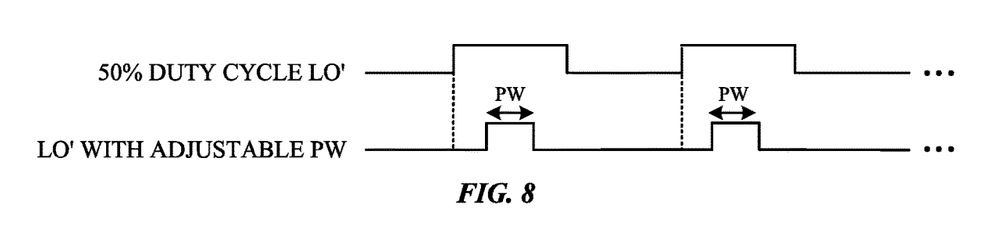
FIG. 8 is a timing diagram illustrating the operation of the pulse generation circuit of FIG. 7 in accordance with some embodiments.

FIG. 7 shows how LO gain controller 64 can alternatively be implemented as a pulse generator 64". As shown in FIG. 7, pulse generator 64" can receive a local oscillator signal with 50% duty cycle from an oscillator and can generate a corresponding signal LO' with an adjustable duty cycle (e.g., by adjusting the pulse width of the LO' signal). FIG. 7 is a timing diagram showing oscillating signals with different duty cycles in accordance with some embodiments. As shown in FIG. 7, pulse generator 64" can generate an LO' signal with a 50% duty cycle or an LO' signal with a tunable pulse width PW so that the LO' signal can exhibit a 25% duty cycle, 12.5% duty cycle, 37.5% duty cycle, 33% duty cycle, 10% duty cycle, 20% duty cycle, 30% duty cycle, 40% duty cycle, or other fractional duty cycle value less than 50% to provide the RF converter block 54 with any desired gain step resolution.

The embodiments herein relating to adjusting the duty cycle of the oscillating signal to control the gain of the RFDACs is exemplary. If desired, the gain control circuitry can additional or alternatively adjust other characteristics of the oscillating signal being provided to the RFDACs to tune the overall gain of the transmit path.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 and/or wireless communications circuitry 24 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in wireless circuitry 24, processing circuitry 18 of FIG. 1, etc.). The processing circuitry may include microprocessors, application processors, digital signal processors, central processing units (CPUs), application-specific integrated circuits with processing circuitry, or other processing circuitry.

The foregoing is exemplary and various modifications can be made to the described embodiments. The foregoing embodiments may be implemented individually or in any combination.

What is claimed is:

1. Wireless circuitry comprising:
   a radio-frequency amplifier having an output coupled to an antenna;
   a radio-frequency digital-to-analog converter (DAC) having an output coupled to the radio-frequency amplifier and having an input configured to receive an oscillating signal; and
   gain control circuitry configured to adjust a gain of the radio-frequency DAC by adjusting a duty cycle of the oscillating signal.

2. The wireless circuitry of claim 1, further comprising: an oscillator configured to output the oscillating signal.

3. The wireless circuitry of claim 1, wherein the gain control circuitry is configured to increase the gain of the radio-frequency DAC by increasing the duty cycle of the oscillating signal and is configured to decrease the gain of the radio-frequency DAC by decreasing the duty cycle of the oscillating signal.

4. The wireless circuitry of claim 1, wherein the gain control circuitry comprises a frequency divider configured to output the oscillating signal.

5. The wireless circuitry of claim 1, wherein the gain control circuitry comprises a pulse generator configured to output the oscillating signal with an adjustable pulse width.

6. The wireless circuitry of claim 1, wherein the radio-frequency DAC comprises a DAC cell in a plurality of DAC cells within a radio-frequency converter block.

7. The wireless circuitry of claim 1, wherein the gain control circuitry is further configured to adjust the gain of the radio-frequency DAC by selectively activating and deactivating one or more switchable components within the radio-frequency DAC.

8. The wireless circuitry of claim 1, wherein the gain control circuitry is further configured to adjust the gain of the radio-frequency DAC by selectively activating and deactivating one or more capacitors within the radio-frequency DAC.

9. The wireless circuitry of claim 1, wherein the gain control circuitry comprises:
   a first control circuit configured to provide a first gain step by selectively activating and deactivating one or more switchable components within the radio-frequency DAC; and
   a second control circuit configured to provide a second gain step different than the first gain step by adjusting the duty cycle of the oscillating signal.

10. The wireless circuitry of claim 9, wherein the second gain step is smaller than the first gain step.

11. The wireless circuitry of claim 1, wherein the radio-frequency DAC is configured to upconvert a baseband signal to a radio-frequency signal.

12. A method of operating wireless circuitry comprising:
   with a radio-frequency data converter circuit, receiving a baseband signal and outputting a corresponding radio-frequency signal;
   adjusting a gain of the radio-frequency data converter circuit by selectively activating and deactivating components internal to the radio-frequency data converter circuit;
   receiving an oscillating signal at the radio-frequency data converter circuit; and
   adjusting the gain of the radio-frequency data converter circuit by adjusting a duty cycle of the oscillating signal.

13. The method of claim 12, wherein:
   selectively activating and deactivating components internal to the radio-frequency data converter circuit implements a first incremental gain step; and
   adjusting the duty cycle of the oscillating signal implements a second incremental gain step less than the first incremental gain step.

14. The method of claim 12, further comprising:
   increasing the gain of the radio-frequency data converter circuit by increasing the duty cycle of the oscillating signal; and
   decreasing the gain of the radio-frequency data converter circuit by decreasing the duty cycle of the oscillating signal.

15. The method of claim 12, further comprising:
   using a frequency divider to adjust the duty cycle of the oscillating signal.

16. The method of claim 12, further comprising:
   using a pulse generator to adjust the duty cycle of the oscillating signal.

17. An electronic device comprising:
   one or more processor configured to output a baseband signal;
   a radio-frequency data converter block configured to receive the baseband signal and to generate a corresponding radio-frequency signal;
   a radio-frequency amplifier having an input configured to receive the radio-frequency signal and having an output coupled to one or more antennas;
   an oscillator configured to output an oscillator signal to the radio-frequency data converter block; and
   gain control circuitry configured to adjust a gain of the radio-frequency data converter block by adjusting a characteristic of the oscillator signal.

18. The electronic device of claim 17, wherein the gain control circuitry is configured to adjust the gain of the radio-frequency data converter block by adjusting a duty cycle of the oscillator signal.

19. The electronic device of claim 17, wherein the radio-frequency data converter block comprises a plurality of digital-to-analog converter (DAC) cells.

20. The electronic device of claim 19, wherein the gain control circuitry is further configured to adjust the gain of the radio-frequency data converter block by selectively activating and deactivating one or more internal components within each of the plurality of DAC cells.

* * * * *